Figure 3:
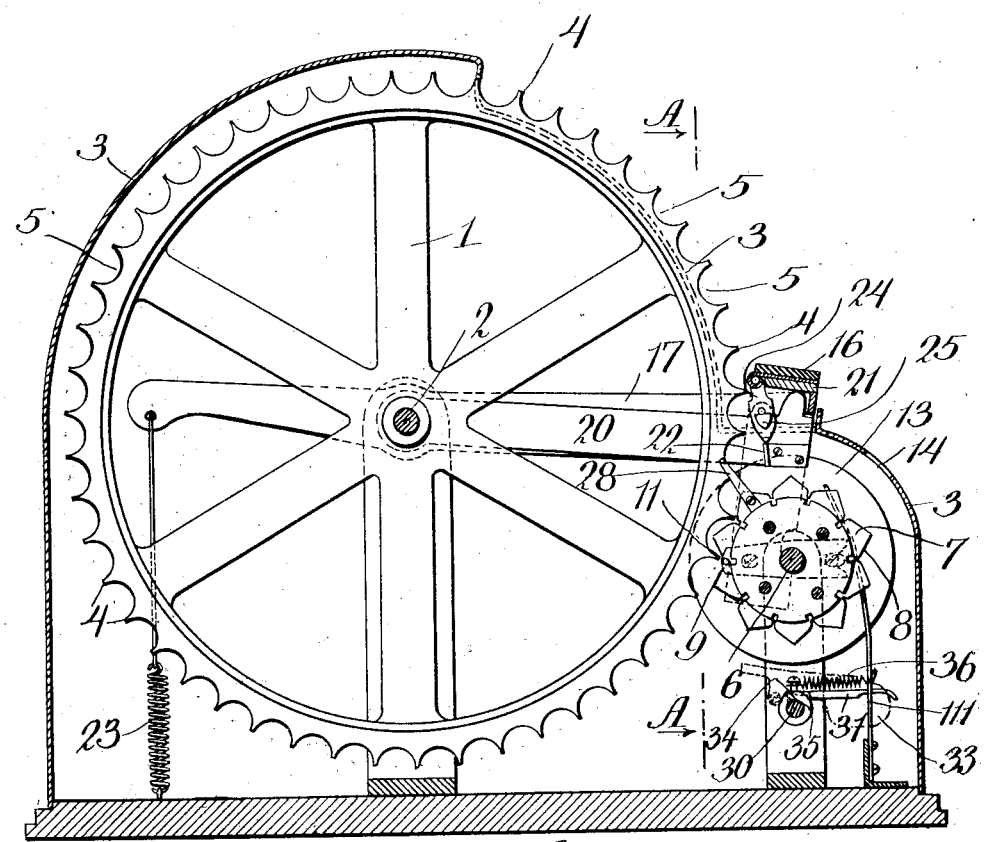

J. FORSHEIM & J. KONIGSBERG.
CALCULATING MACHINE.
APPLICATION FILED SEPT. 14, 1907. RENEWED JUNE 17, 1913.
1,085,561.
Patented Jan. 27, 1914.
9 SHEETS—SHEET 1.
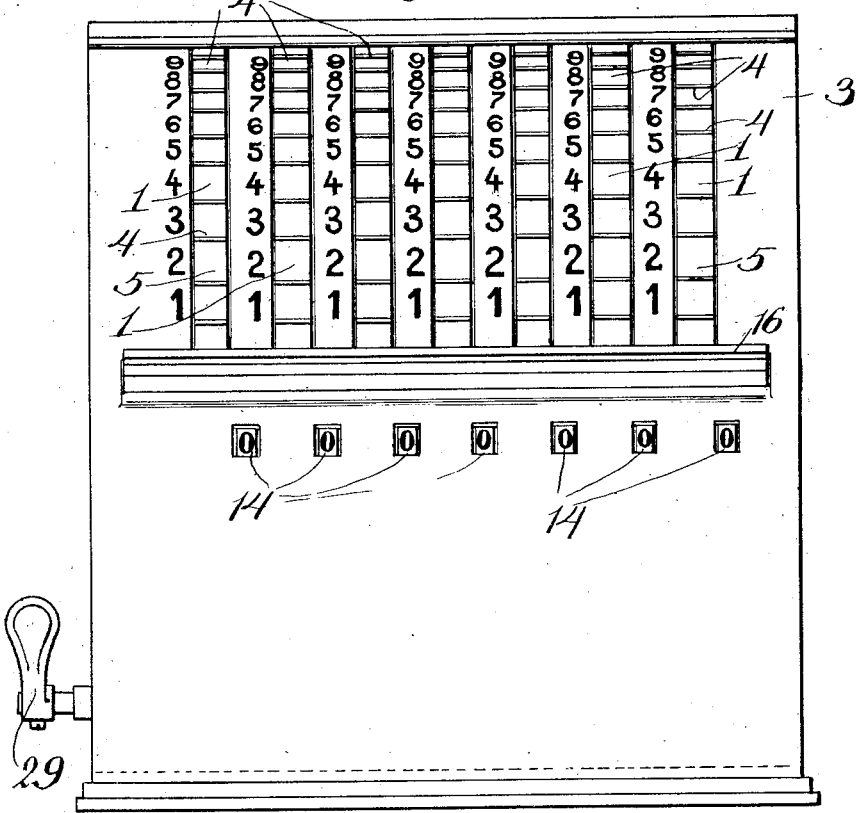
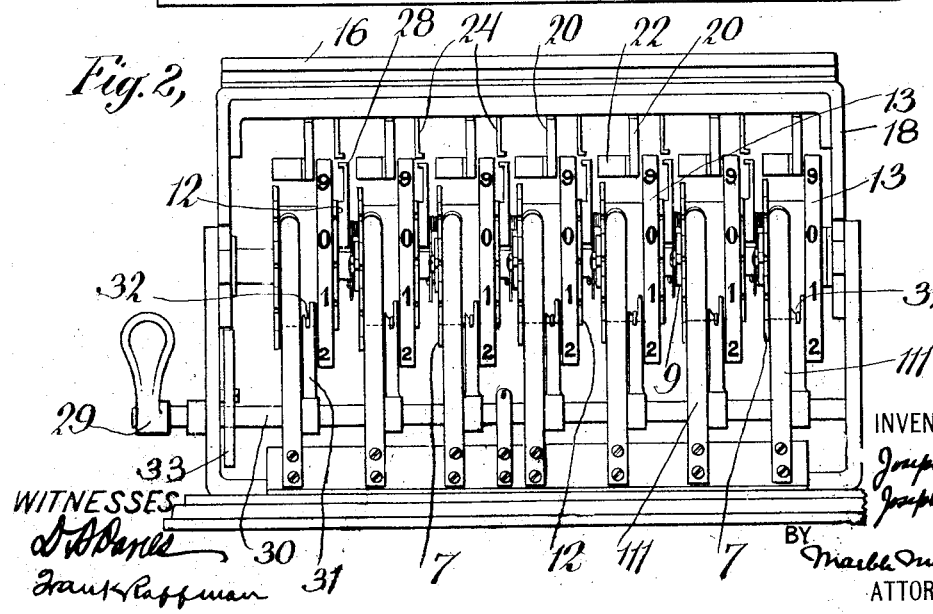

J. FORSHEIM & J. KONIGSBERG.
CALCULATING MACHINE.
APPLICATION FILED SEPT. 14, 1907. RENEWED JUNE 17, 1913.

1,085,561.

Patented Jan. 27, 1914.
9 SHEETS—SHEET 2.

WITNESSES:

INVENTORS

ATTORNEYS

J. FORSHEIM & J. KONIGSBERG.
CALCULATING MACHINE.
APPLICATION FILED SEPT. 14, 1907. RENEWED JUNE 17, 1913.
1,085,561.
Patented Jan. 27, 1914.
9 SHEETS—SHEET 3.
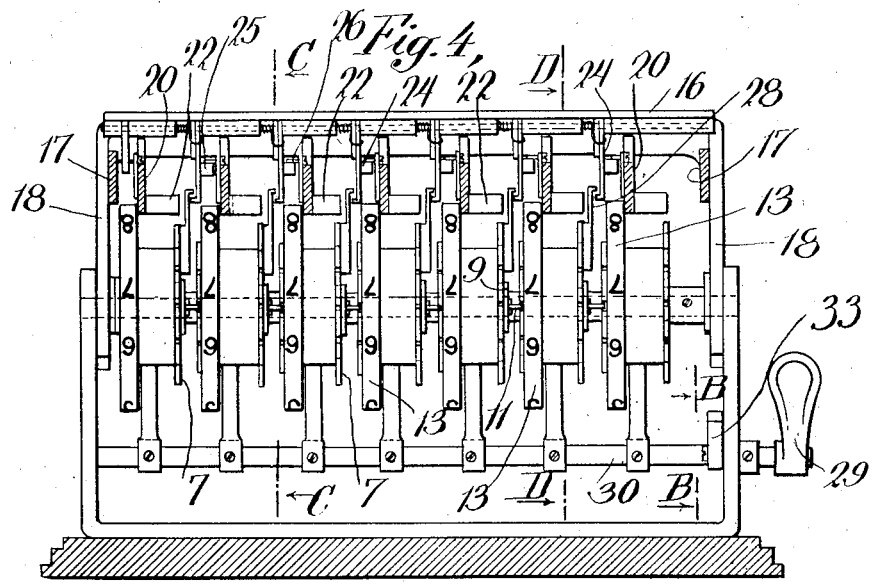
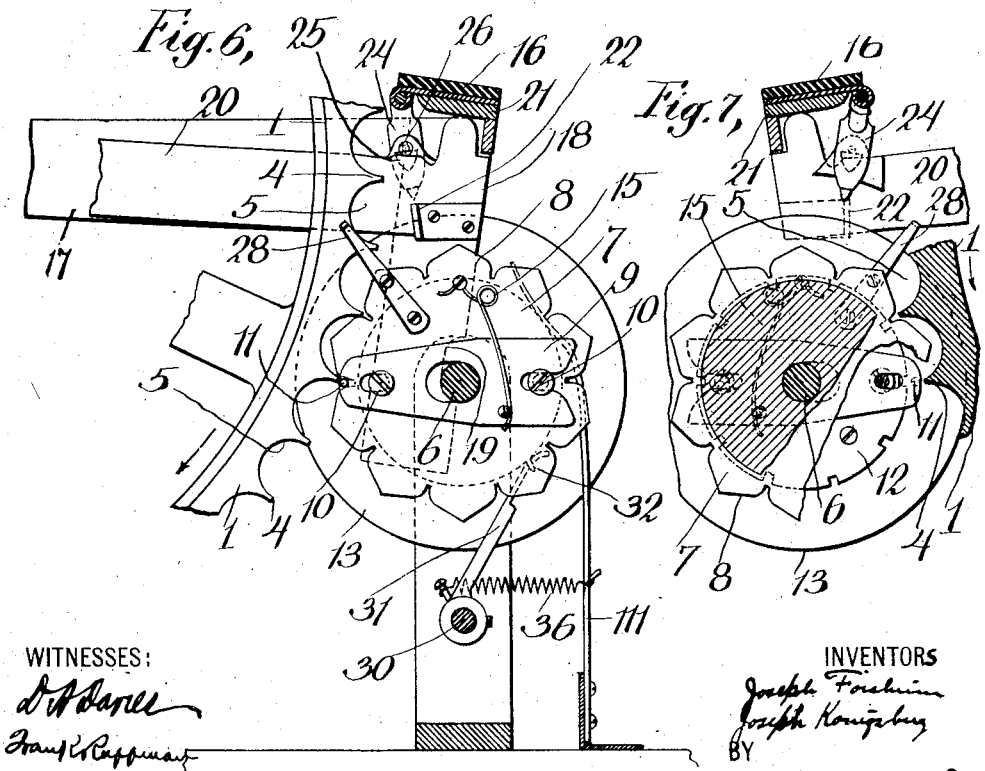
WITNESSES:
INVENTORS
ATTORNEYS

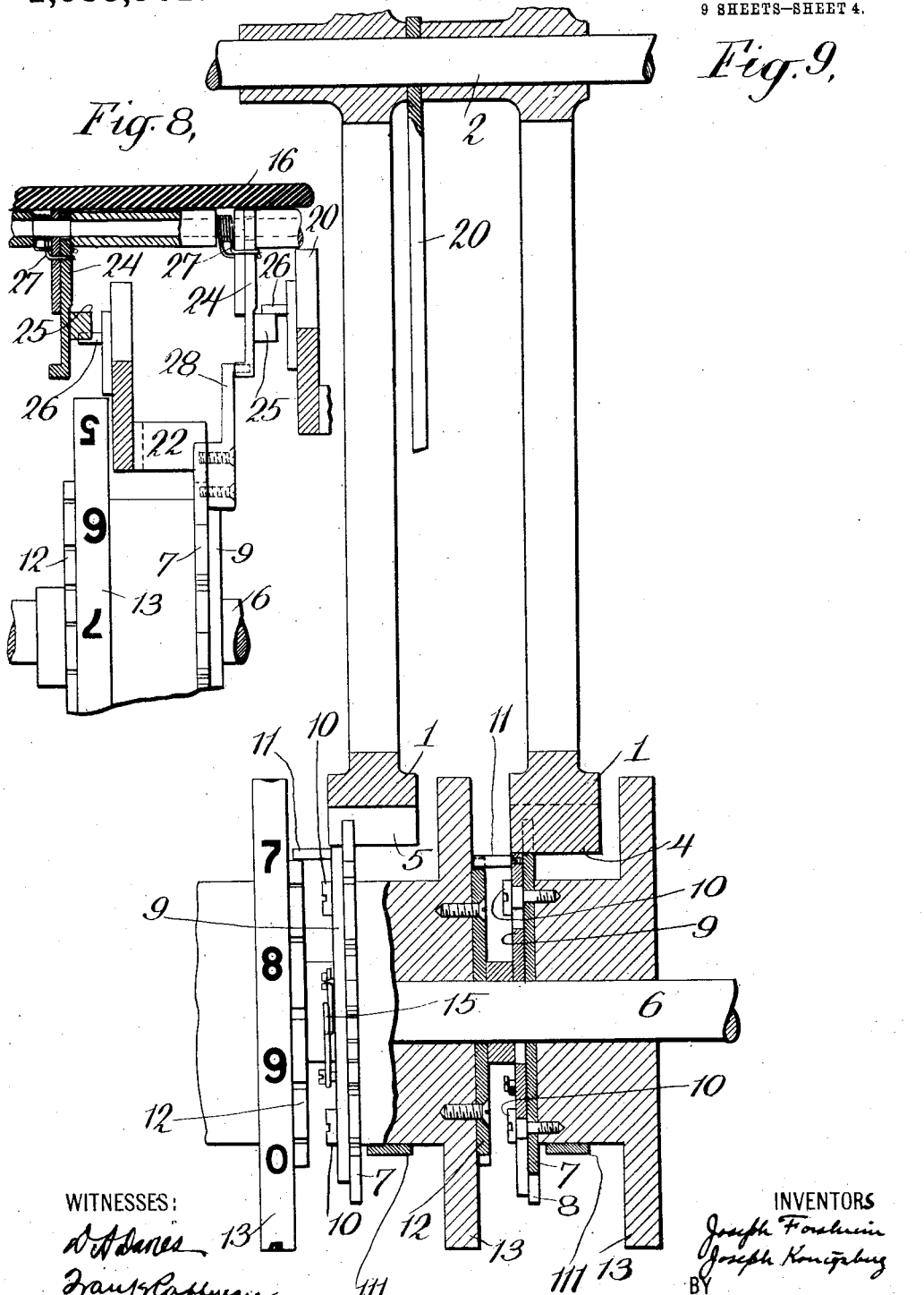

J. FORSHEIM & J. KONIGSBERG.
CALCULATING MACHINE.
APPLICATION FILED SEPT. 14, 1907. RENEWED JUNE 17, 1913.
1,085,561.
Patented Jan. 27, 1914.
9 SHEETS—SHEET 5.
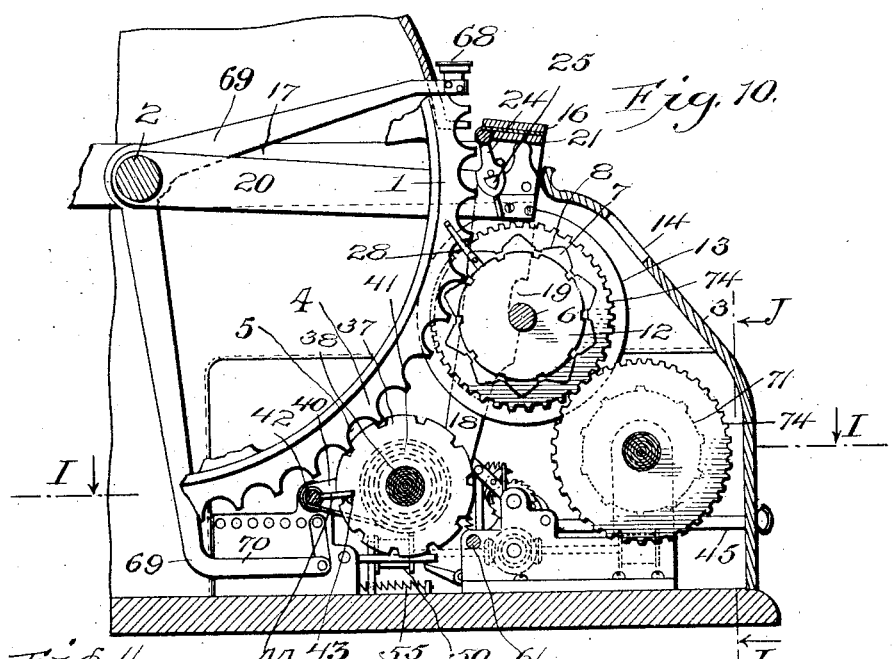
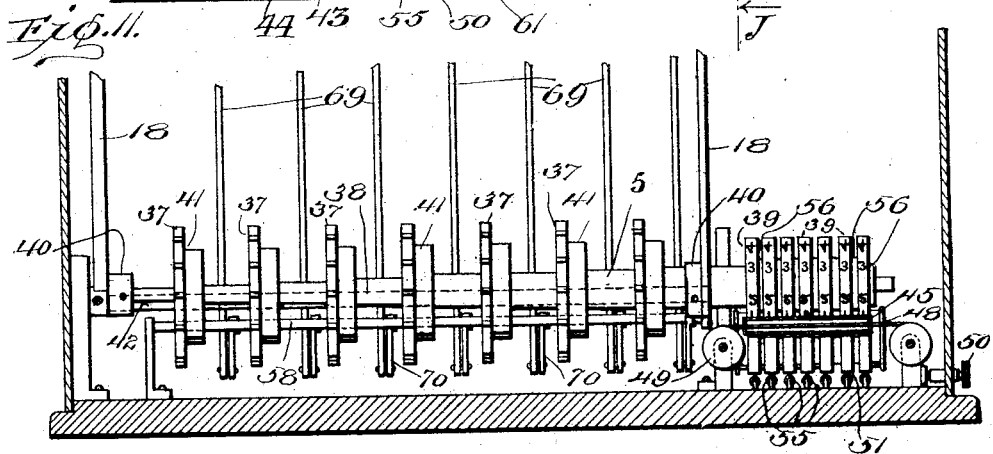
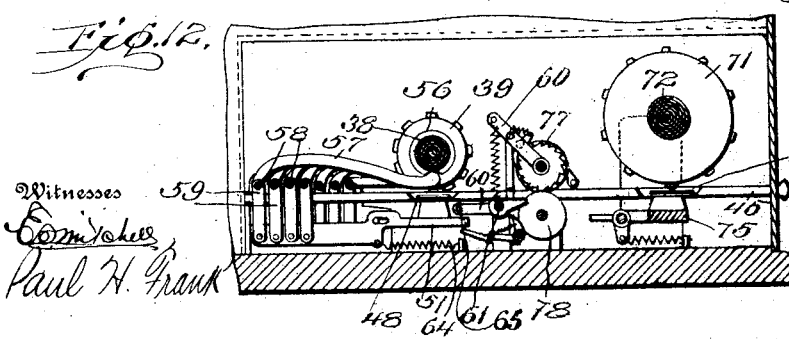

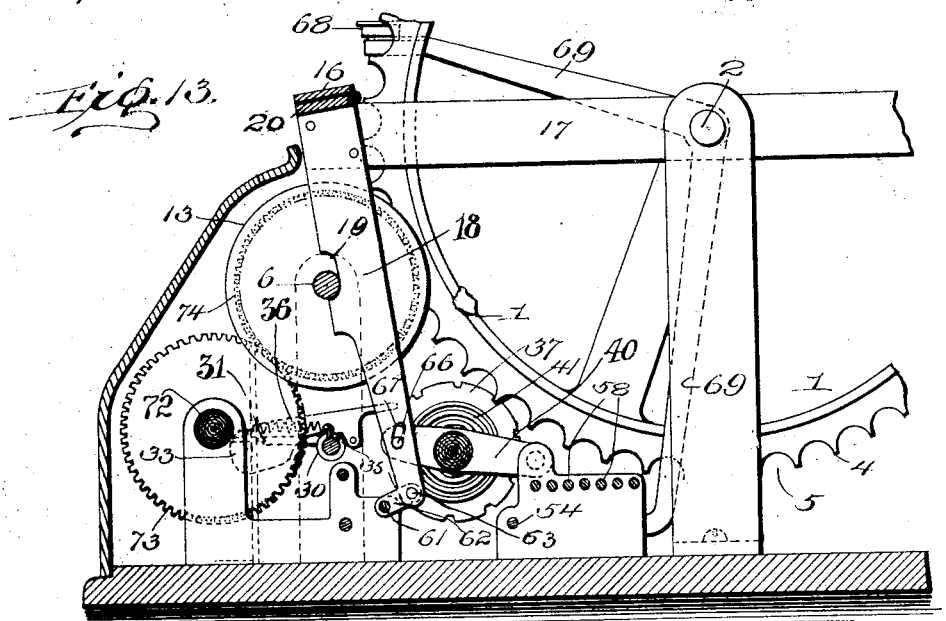
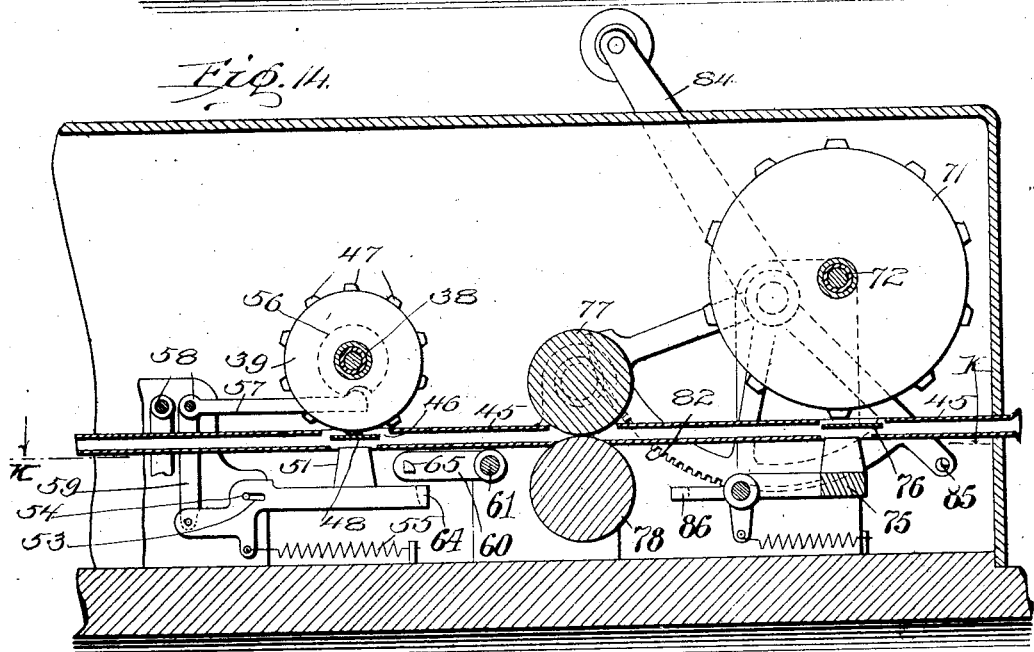
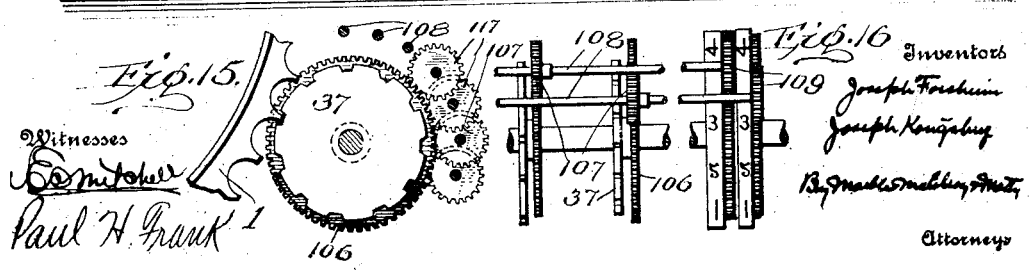

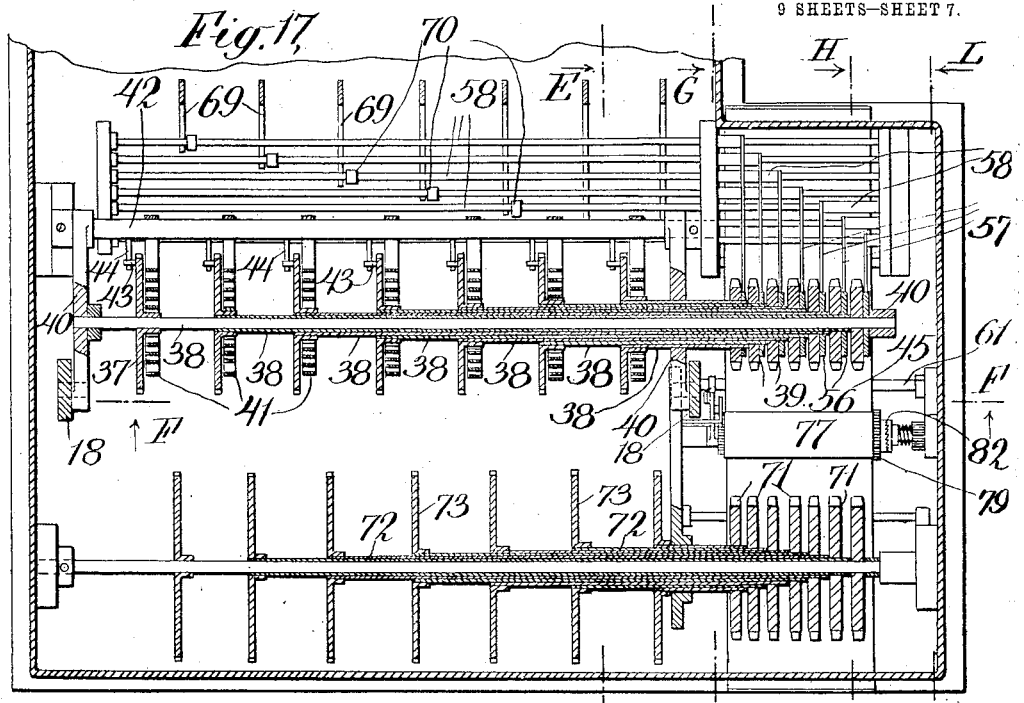
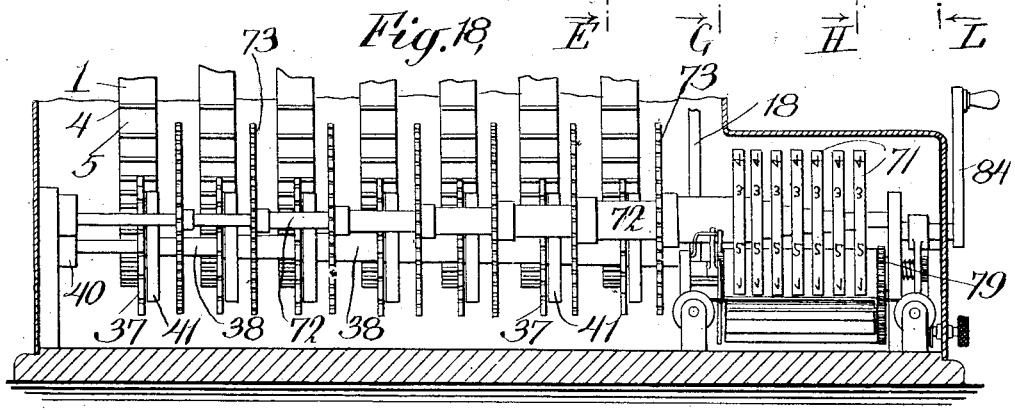
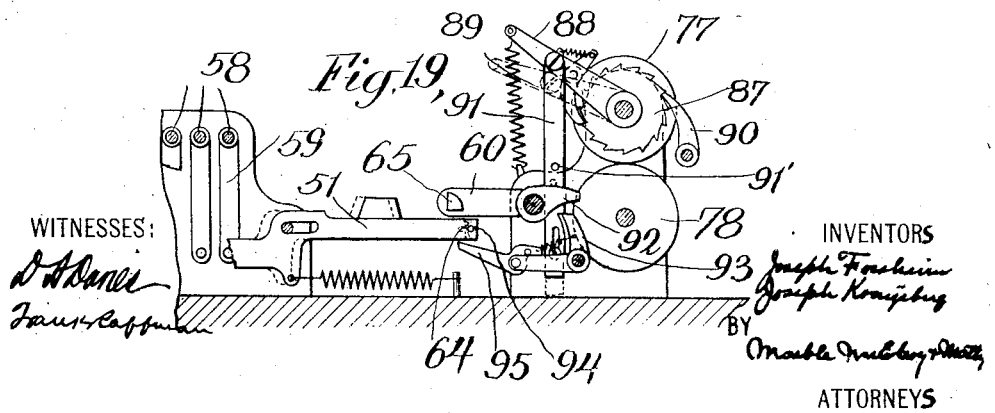

J. FORSHEIM & J. KONIGSBERG.
CALCULATING MACHINE.
APPLICATION FILED SEPT. 14, 1907. RENEWED JUNE 17, 1913.

1,085,561.

Patented Jan. 27, 1914.

J. FORSHEIM & J. KONIGSBERG.
CALCULATING MACHINE.
APPLICATION FILED SEPT. 14, 1907. RENEWED JUNE 17, 1913.
1,085,561.
Patented Jan. 27, 1914.
9 SHEETS—SHEET 9.
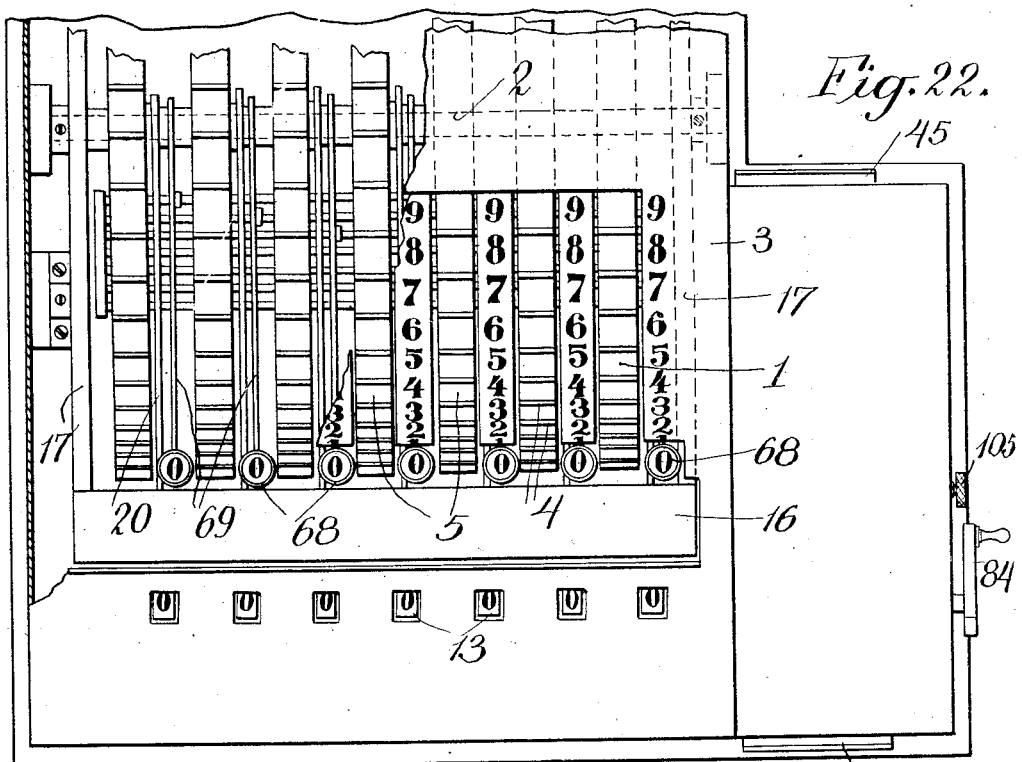
Fig. 22.
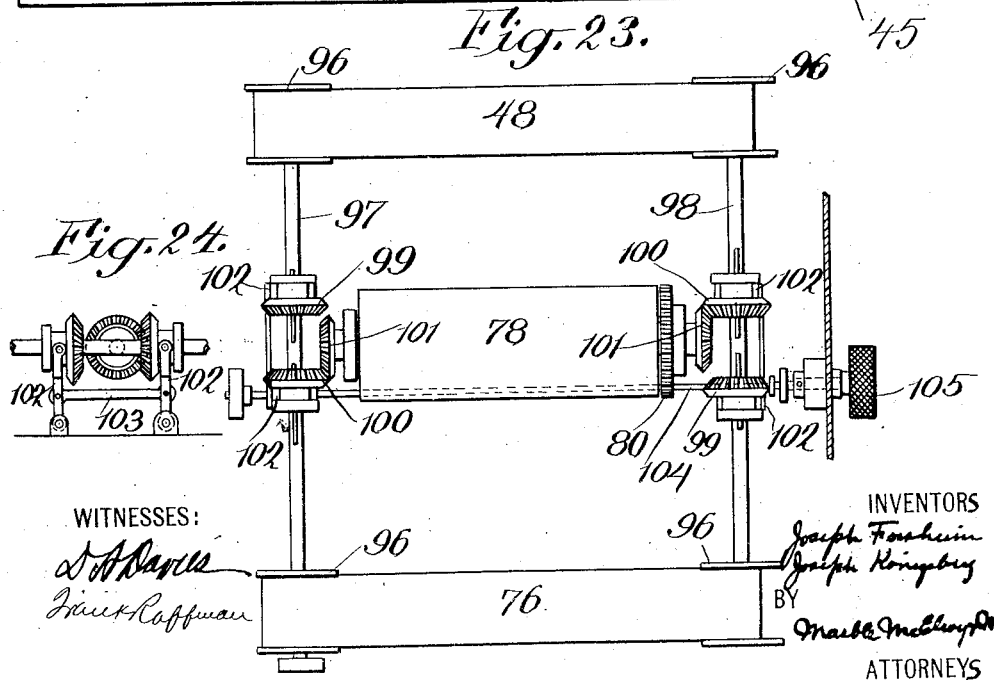
Fig. 23.
Fig. 24.
WITNESSES:
INVENTORS
Joseph Forsheim
Joseph Konigsberg
BY
ATTORNEYS

UNITED STATES PATENT OFFICE.

JOSEPH FORSHEIM AND JOSEPH KONIGSBERG, OF NEW YORK, N. Y., ASSIGNORS TO LENA S. FORSHEIM, OF NEW YORK, N. Y.

CALCULATING-MACHINE.

1,085,561.      Specification of Letters Patent.      Patented Jan. 27, 1914.

Application filed September 14, 1907, Serial No. 392,849. Renewed June 17, 1913. Serial No. 774,236.

*To all whom it may concern:*

Be it known that we, JOSEPH FORSHEIM and JOSEPH KONIGSBERG, both citizens of the United States, and both residents of the city, county, and State of New York, have invented certain new and useful Improvements in Calculating-Machines; and we do hereby declare the following to be a full, clear, and exact description of the same, such as will enable others skilled in the art to which it appertains to make and use the same.

Our invention relates to calculating machines, and particularly to machines adapted for addition and subtraction, and comprises an improved and simplified mechanism comprising relatively few parts and those of simple form and construction.

The objects of our invention are to improve and simplify calculating machines such as referred to, to make the same easy to operate, to reduce the number of parts required, to enable these parts to be of strong and simple forms, to provide for "listing", that is to say, printing on a suitable record slip each number added and the totals, and generally to produce a compact, simple and relatively inexpensive machine which is easily operated, accurate, and neat in appearance.

Our calculating machine comprises a plurality of precisely similar elements; the range of the machine being determined by the number of such elements embodied in it. Each element comprises an operating member, usually a rotary wheel or disk, provided on its periphery with divisions, preferably in the form of teeth with intermediate recesses or finger-holds adapted to receive the fingers of the operator, and reducing carrying or transfer mechanism, whereby motion of any one but the last or left hand one of said wheels or operating members is transmitted to the wheel or operating member above at the predetermined ratio of reduction. Ordinarily this ratio is 10 to 1. In certain cases, as for example in machines adapted for dealing with items stated in terms of British currency, there may be a different ratio between the different wheels; for example between a pence wheel and a shilling wheel the transfer mechanism may have a ratio of twelve to one; and between a shilling wheel and a pound-sterling wheel the transfer mechanism may have a ratio of twenty to one. However, for most purposes the transfer mechanism should have a ratio of 10 to 1 and such is the case in the machine illustrated herein.

The machine as a whole is inclosed within a suitable case, a portion of the front of which has substantially the curvature of the said wheels and has opposite said wheels slots through which the teeth of the wheels project to be actuated by the operator's fingers. In the spaces between said slots are vertical rows of numerals (0 to 9 inclusive when the ratio of reduction between the different wheels is 10 to 1), spaced apart at distances corresponding to the distance between the several teeth of said wheels.

In adding, to operate the mechanism for a particular number, the operator places his fingers in the appropriate recesses or finger-holds opposite the proper columns and numbers on the case of the machine, and moves the wheels down to a key extending across the face of the machine and itself slightly depressible for a reason hereinafter explained, and hereinafter termed the "alining key". He then repeats the operation for the next number and so on. Totals are shown on numbered wheels visible through the case of the machine and actuated by the transfer mechanism. In subtracting, the reverse operation is followed, the fingers of the operator being placed in recesses or finger-holds, next said alining key, of the wheels opposite the proper columns of figures, and then moved upward until opposite the appropriate numbers in said columns, the alining key being then depressed; after which the machine is operated in like manner for a further number.

We will now proceed to describe our invention with reference to the accompanying drawings, in which one form of adding and subtracting machine embodying our invention is illustrated.

Figure 5:
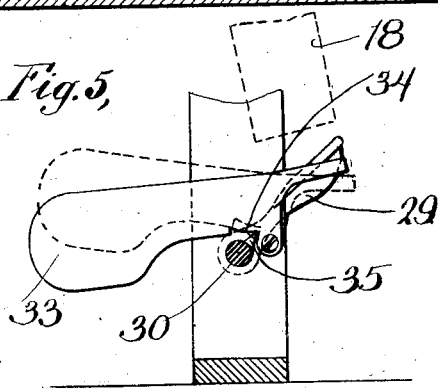
Figure 20:
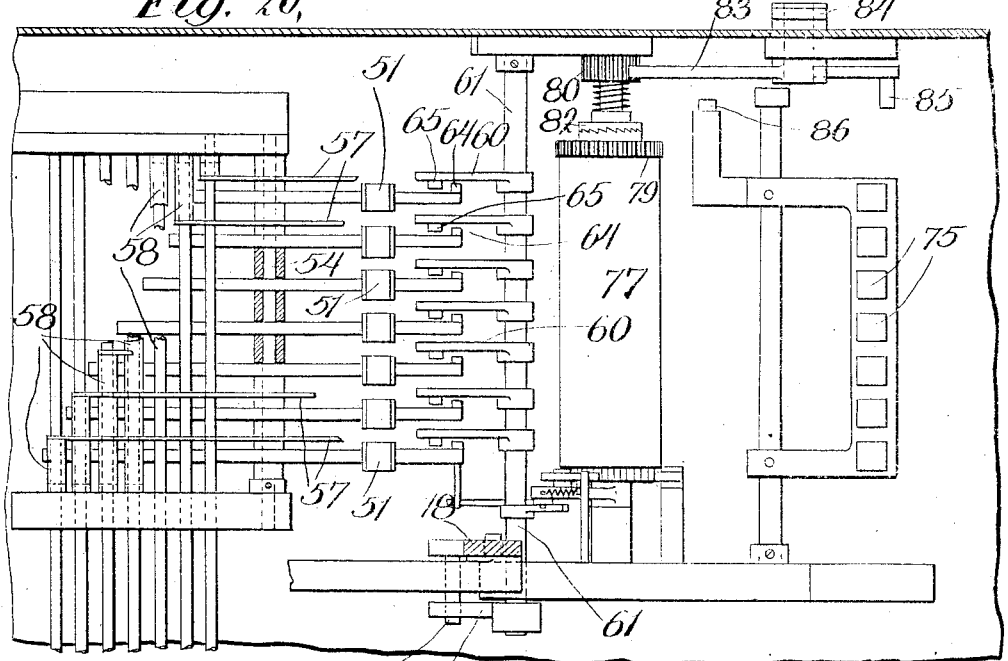
Figure 21:
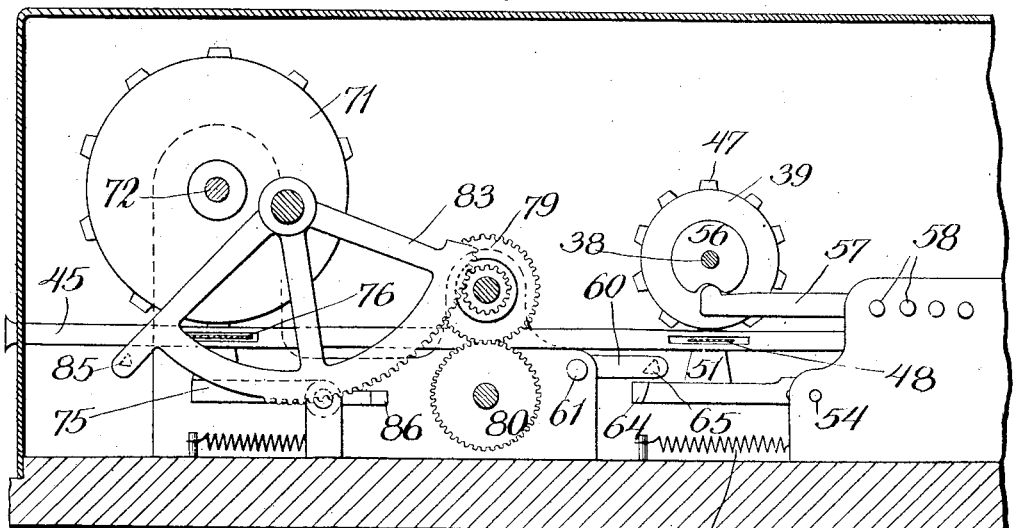

In said drawings: Figure 1 is a front elevation of the said machine; Fig. 2 is a front elevation of the mechanism in the lower part of the case of such machine, the front plate having been removed; Fig. 3 shows a vertical transverse section of the machine showing in side elevation one of the elements of the machine, comprising an operating wheel and transfer mechanism therefor; listing and total-printing mechanism being omitted; Fig. 4 is a view of the same mechanism shown in Fig. 2, but looking from the rear toward the front; the view being a section on the line A—A of Fig. 3; Fig. 5 is a detail side view of the latch of the resetting device; the view being a section on the line B—B of Fig. 4. Fig. 6 is a detail transverse section of one of the transfer mechanisms which transmit and reduce motion from the several wheels to the wheels next above, the view being on a larger scale than the preceding views. It may be understood to be a section on the line C—C of Fig. 4. Fig. 7 is a detail view of the same parts looking in the opposite direction; and the view may be understood to be a section on the line D—D of Fig. 4; Fig. 8 shows a detail top view and partial section of parts of one of the transfer mechanisms, and particularly shows the alining means; Fig. 9 shows a transverse section on a plane passing through the shaft of the operating members and the shaft of the transfer wheels, certain of the parts being shown in section and others in top view. Fig. 10 is a detail transverse section similar to Fig. 3 but with listing and total-printing mechanism added; the view being a section on the line E—E of Fig. 17; Fig. 11 is a detail front view of the listing mechanism; the view being a section taken on the line F—F of Fig. 17; Fig. 12 shows a detail transverse section through the listing and total-printing mechanism; the view being a section on the line G—G of Fig. 17; Fig. 13 is a detail transverse section through the machine looking in the opposite direction as compared with Fig. 10; Fig. 14 is a detail side elevation and partial section of the listing and total-printing mechanism; the section being taken on the line H—H of Fig. 17; Figs. 15 and 16 are respectively a detail transverse section and a detail front view of an alternative "cross over" mechanism which may be used in lieu of that illustrated in other figures of the drawings; Fig. 17 shows a transverse horizontal section through the centers of the listing and total-printing shafts, the view shows substantially a section on the line I—I of Fig. 10; Fig. 18 shows a detail front elevation of the total printing mechanism, the view being substantially a section on the line J—J of Fig. 10; Fig. 19 is a detail side view of a portion of the total-printing mechanism. Fig. 20 shows a detail horizontal section taken substantially on the line K—K of Fig. 14 through the listing and total-printing mechanism; Fig. 21 shows a vertical section through the listing and total printing mechanisms taken on the line L—L of Fig. 17. Fig. 22 shows a top view, with parts broken away, of the machine provided with listing and total printing mechanisms, and shows in particular the location of the "zero" keys. Figs. 23 and 24 are detail views showing one form of ribbon feeding and shifting mechanism which may be employed in the listing and total-printing mechanisms, Fig. 23 showing a top view of such ribbon feeding and shifting mechanism, and Fig. 24 an end view thereof.

In said drawings, numerals 1 designate the several operating members or wheels, 2 a shaft on which said wheels are mounted, 3 a casing inclosing said wheels and having slots opposite said wheels through which the teeth 4 of said wheels project. Between the said teeth of each wheel are recesses 5 of size and shape adapted to receive the tips of the operator's fingers. In practice these recesses are practically semi-circular. The several transfer mechanisms for carrying from one wheel to the wheel next above, are mounted upon a shaft 6 in front of and below shaft 2. Each such transfer mechanism comprises a gear wheel 7 having teeth 8 of wedge shape, which adapts them to coact to best advantage with the alining devices hereinafter mentioned, the number of such teeth of each wheel 7 corresponding to the ratio of intended reduction from such wheel to the wheel "above," or to the left.

For carrying according to the predetermined ratio of reduction from one element of the machine to the next, we arrange to connect each gear 7 (except the last) to the corresponding gear next above, once in each revolution. To this end, we provide each gear 7 (except the last) with a sliding connecting member 9 mounted upon guide studs 10 of such gear 7 and having a pin 11 formed and positioned to engage the notches of a disk 12 connected to and forming substantially a part of the gear 7 next beyond, and having the same number of notches, and adjacent to said disks 12 and likewise substantially forming parts of the corresponding gears 7, are total-indicating disks 13, having on their peripheries numerals corresponding in number and position to the teeth of said reduction wheels; and these numerals (which show the totals) are visible through openings 14 in the front of the case 3. Normally, each pin 11 is clear of the adjacent wheel 12 the next "adding element," being held in such position by a spring 15 acting on sliding member 9, but when that end of said member 9 which carries said pin is passing one of the teeth of the corresponding wheel 1, said tooth presses said member 9 in, so as to engage its pin 11 with a notch of the disk 12 of the gear 7 next beyond, so moving said disk, the corresponding disk 13, its gear 7, and the corresponding wheel 1. Such movement continues for somewhat less than the space of one tooth; the balance of the movement of the gear 7 so actuated being effected by inertia or by the alining device hereinafter described.

Each transfer mechanism is, as will be seen, in effect a reducing gearing having a driving member with teeth corresponding in number to the ratio of reduction and having a driven member with but one tooth (pin 11); and each gear 7 (except the first and the last) forms an element of two adjacent transfer mechanisms, being the driving member of one such mechanism and the driven member of the one below or to the right.

It is important in a machine of this sort that both back-lash and over-travel of the gearing shall be counteracted, and that the numerals seen through these openings 13 shall be lined up accurately. For this purpose we employ the depressible alining-key 16 arranged transversely across the front of the machine just in front of the operating wheels 1, and in such position that the operator's fingers in actuating the said wheels will depress said key. Arms 17 pivoted upon shaft 2 support this key 16 and are provided with downward projections 18 having notches 19 (Fig. 6) embracing shaft 6 and so serving to limit the motion of said alining key 16. Alongside each wheel 1 is an arm 20 pivoted on shaft 2, arranged to be engaged at its front end by a plate 21 of alining key 16 when said key is depressed, and provided with a blade cam 22, one function of which is to engage the inclined edges of the teeth 8 of the corresponding gear 7, if such gear has not been moved through the entire space of one tooth by the pin 11 of the gear 7 next in rear or to the right, (said inclined edges being in fact wedges adapted for engagement by said blade cam 22), and by cam or wedge action to force such wheel 7 through the remainder of such space. In this way any under-travel in the transmission of motion from one wheel 1 and gear 7 to the next gear and wheel is prevented, the pin 11 being required to move the gear 7 next beyond through only a little more than half the space of one of the teeth 8, the remainder of the movement being completed, if necessary, by the appropriate blade cam 22 operated by the key 16.

Springs 23 raise the key 16 after each depression thereof, and catches 24 pivoted to the under side of said key are provided with side lugs 25 which engage pins 26 carried by the arms 20, so that normally when the key 16 rises the said catches 24, engaging pins 26, raise the cam arms 20. Springs 27 hold said catches normally in position to so engage said pins. Said catches, besides serving to raise the blade cams, also serve to release same to prevent overtravel of any gear 7 when operated by the corresponding gear 7 next below or to the right. To this end, arms 28, carried by the gears 7, are each arranged to engage the catch corresponding to the gear 7 next beyond, at the instant when the gear 7 corresponding to said arm and said gear 7 next beyond are in engagement through one of the pins 11, so releasing the cam 22 corresponding to such second gear 7 and causing said cam to drop and arrest such second gear 7 as soon as it has been moved through the space of one tooth.

The side lugs 25 are V-shaped as shown, so that on the next descent of the alining key 16 the pointed lower end of a catch previously tripped as above described, engaging a pin 26, causes said catch to be pushed to one side until the lug 25 has passed beneath said pin; and then the spring of the catch causes the latter to reëngage the said pin 26.

The operation of the machine thus described is as follows: In adding, the operator places his fingers in the notches or finger-holds of wheels 1 opposite the desired numbers of the proper columns on the front of the case, and moves said wheels down to the key 16, in so doing depressing said key slightly. For example, if the number to be added be 345, the operator will place his finger in the notch of the hundreds wheel opposite numeral 3 of the hundreds column, and will move said wheel down to key 16, depressing the latter slightly. He will then place his finger in the notch of the tens wheel opposite numeral 4 of the tens column, and will move that wheel down in like manner; and he will then place his finger in the notch of the units wheel opposite numeral 5 of the units column and will move that wheel down. In so moving the wheels 1, the gears 7 in mesh therewith are rotated. Other numbers are added in the same way. When, in the rotation of any one of the gears 7, the numeral 9 on its disk 13 passes the corresponding window 14 in the front of the case, one of the teeth 4 of the corresponding wheel 1 presses inward the slide 9 on that gear 7, so pressing the pin 11 of such slide into engagement with a notch of the disk 12 of the gear 7 next beyond (all as indicated in Fig. 6) so causing such next higher gear 7 to move through the space of one tooth. At the instant when such higher gear 7 is rotated as described, the catch 24 corresponding to such higher gear 7 is tripped by the action of the arm 28 of the "driving" gear 7, so permitting the knife cam 22 corresponding to the "driven" gear 7 to drop. The pin 11 so connecting the said gears 7, will ordinarily disengage the disk 12 of the driven gear 7 before the latter has moved through the entire space of one tooth; but when the alining key 16 next descends, one of the knife cams 22, being pressed downward, will act as a cam upon one of the teeth of the said driven gear 7 to force such gear through the remainder of the space of one tooth; and if because of its inertia the driven gear 7 tends to rotate beyond the space of one tooth, the blade cam 22, tripped as above described, drops into one of the notches between the teeth of such driven gear 7 at the instant the movement through the space of one tooth is completed, so preventing overtravel. In subtracting with this machine the operator, having first operated the machine to show the number to be subtracted from, places his fingers in those recesses of the proper wheels 1 which are opposite the key 16, and moves said wheels upward until his fingers are opposite the proper numbers on the front of the machine. This rotates the adding elements backward and in such rotation motion is transmitted from one gear 7 to another through the pins 11 and notched disks 12, the same as in addition. After each such backward rotation of a wheel 1 the key 16 is depressed, so as to take up any backlash. When the addition or subtraction of a column of figures is completed and it is desired to reset the machine to zero, the operator presses backward or toward the rear of the machine a handle 29. This handle is on a rock shaft 30 carrying stops 31 adapted to engage pins 32 on the hubs of gears 7 as indicated particularly in Fig. 6. A weighted detent 33 (Fig. 5) has a notch 34 which engages a tooth 35 on said shaft 30 when the handle 29 is pressed backward as described, so holding the stops 31 in elevated or arresting position. The operator then turns each wheel 1 backward, beginning at the left of the machine, until the pin 32 of each element engages its corresponding stop 31 and so arrests the further movement of the corresponding adding wheel 1, at which time the numeral 0 on the rim of the corresponding indicating wheel 13 will be opposite the corresponding opening 14, in the case 3. The operator then trips the detent 33 by depressing the key 16, one of the downward extensions 18 thereof engaging said trip and operating it so as to release tooth 35, whereupon the stops 31 are lowered to their original nonengaging position by a spring 36 connected to the rock shaft 30, and the machine is then in readiness for another series of additions.

In addition to indicating totals by means of the numbered total wheels 13, the machine may be provided with listing mechanism for printing the several numbers or items on a slip of paper, and also with total printing mechanism. This is illustrated in Figs. 10 to 24, which show the adding mechanism above mentioned with listing and total-printing mechanism added thereto. In these figures numerals 37 indicate a plurality of notched disks or gear wheels, one for each of the adding wheels 1, and adapted to mesh with the teeth thereof. These wheels 37 are mounted on individual shafts 38 arranged concentrically, each such shaft carrying at one side of the machine a corresponding type-wheel 39. It is intended that when any one of the adding wheels 1 is rotated, its corresponding gear 37 shall be rotated and that as soon as the rotation of such wheel 1 is finished (as will be the case when the finger of the operator reaches and depresses the alining key 16), the gear 37 so operated and its type-wheel 39 shall both return to zero position. One of the many convenient ways of returning the gear wheel and type-wheel to zero is to cause each gear wheel to move out of mesh with its wheel 1 when the rotation of said wheel is completed, that is to say, when the key 16 is depressed; and to provide springs for returning said gear wheels and adding wheels to zero when such wheels are so released. To this end we mount the several shafts 38 upon a rocking carrier comprising pivoted arms 40 (Figs. 10, 11, 13 and 17); and as shown in Fig. 13, one of the downward extensions 18 from the key 16 engages one of said arms 40 so that when base piece 16 is depressed, arms 40 are also depressed and disengage gears 37 from the teeth of wheel 1. Each gear 37 is connected to one end of a spiral spring 41, the other end of which is anchored to a convenient fixed portion of the machine, for example, the shaft 42 upon which said arms 40 are pivoted; and each gear 37 is further provided with a stop pin 43 (Fig. 10) arranged to engage a corresponding stop pin 44 carried by said shaft 42; each wheel 37 and its corresponding type wheel 39 being in zero position when the corresponding stop pins 43 and 44 are in engagement.

Beneath the series of printing wheels 39 is a paper chute 45 having an opening at 46 for the passage of the raised type 47 of the printing wheels 39; and an ink ribbon 48 is arranged to pass transversely through and across said paper chute from one reel 49 to another reel 50 or vice versa. Beneath the chute and wheels 39 are a series of hammers 51 (one for each type-wheel) and above these hammers and in line with opening 46 the paper chute has another opening 52. These hammers have slots 53 through which a shaft 54 passes; the hammers being all pivoted thereon; and springs 55 normally tend not only to hold said hammers up, but also to pull them out, i. e., away from said shaft 54, as much as possible. Each type-wheel 39 is provided with a notched cam 56 (the outline of which is shown in Figs. 12 and 21 and in dotted line in Fig. 14); and beneath each of said cams is a follower 57 pivoted to an individual rock shaft 58 and provided with a depending arm 59 (Fig. 14) connected to the corresponding hammer 51. The construction is such, as will be seen, that when any type-wheel 39 is rotated from its normal or zero position, the corresponding cam 56, operating the corresponding follower 57, rock shaft 58, and arm 59 (each follower 57, rock shaft 58 and arm 59 in effect forming a bell crank lever) will slide the corresponding hammer 51 backward on its pivotal shaft 54, the slot 53 in the hammer permitting this movement. For each hammer 51 there is a corresponding snapper 60 mounted upon a transverse shaft 61 and provided with an arm 62 engaged by a pin 63 carried by one of the downward extensions 18 of the alining key 16 (see Fig. 13). Each hammer 51 is provided with a side lug 64 and the corresponding snapper 60 is provided with a corresponding side lug 65: the construction being such that when shaft 61 is oscillated, upon the depression of the alining key 16, the teeth 65 of the snapper 60 all pass the teeth 64 of the hammers 51, except in the case of the particular hammer 51 which has been drawn backward through the rotation of its corresponding type-wheel, as above described. The tooth 64 of that hammer and the corresponding snapper tooth 65 engage, so that the hammer is depressed against the tension of its spring 55; and then the tooth 65 slips by the tooth 64, permitting that hammer so depressed to spring up again under the influence of its spring 55, and to strike the paper strip against the ribbon 48 and so print an impression on the paper strip. As soon as a character has been printed in this manner the depression of the carrier 40 consequent upon the depression of the alining key 16, moves the various gears 37 out of mesh with the operating wheels 1, and the spring 41 of that gear 37 and type-wheel 39 which have been rotated, moves the same back to zero position. In order that this disengagement of the gear 37 from its adding or operating wheel 1 may not occur until after the hammer has operated, and the character has been printed, the engagement of the member 18 of the alining key 16 with the carrier 40 of the gears 37 is by means of a pin 66 working in a slot 67 in member 18, as shown in Fig. 13.

When the number to be added contains a zero (for example, the number 405), the wheel 1 in the column corresponding to the zero will not be operated; and to print the corresponding zero on the listing strip we provide a series of finger keys 68 just above and slightly in rear of the alining keys 16 and just to one side of the corresponding wheels 1; these finger keys being mounted upon pivoted bell crank levers 69 which engage each a corresponding arm 70 on the pivot shaft 58 of the corresponding hammer 51. It will be seen that the depression of one of these keys 68 and of alining key 16 has the effect of depressing the corresponding hammer 51, just as if the corresponding wheel 1 has been operated and the corresponding cam 56 had operated its follower; and therefore when one of said keys and the alining key are depressed the corresponding hammer, operating, causes the printing of a zero on the paper strip, as desired.

For printing the totals we provide another series of type-wheels 71 likewise arranged over an opening in the paper chute 45, each such type-wheel 71 mounted on its individual shaft 72 (these shafts being shown arranged concentrically), each such shafts having upon it a gear wheel 73 meshing with a gear wheel 74 upon the hub of the indicating disk 13 of the corresponding adding element. It will be seen that as each of these disks 13 rotates, its corresponding type-wheel 71 will rotate; and since the figures on the periphery of the disks 13 indicate, through windows 14, the totals, so will impressions taken from these type-wheels 71 be the totals. Beneath type wheels 71 we mount a common spring-actuated hammer 75 for striking the paper strip to give the desired impression; and we provide beneath the type wheel 71 a suitable inking ribbon 76.

Since it is desirable, of course, that the totals be printed just beneath the last item printed by the listing wheels 39, we provide feed rollers 77 and 78, one above and the other beneath the paper strip, and drivingly connected by gears 79 and 80 respectively; and we further provide pinion 81 arranged to drive gear 79 and roller 77 through a spring ratchet clutch 82, and a gear segment 83 in mesh with gear 79 and arranged to be oscillated by a handle 84; the length of travel of arm 84 being such that when said arm is moved to the full extent and roller 77 and 78 rotated thereby, the paper strip will be fed forward the required distance to bring the proper point on said strip beneath the type-wheels 71. The gear segment 83 has a projecting lug 85 which, at the conclusion of such feeding movement of handle 84, engages a lug 86 of the hammer 75 and then slips past the same, the construction being such that as this occurs the hammer is first drawn back and then released and caused to strike against the paper. We do not employ individual hammers for the several total wheels 71, as this is hardly necessary, there being no objection to printing, in the totals, zeros to the left of the digits.

The same feed rollers 77 and 78 serve to feed the paper step by step between the printing of the several items by the listing wheels 39. To this end we provide one of said rollers with a ratchet wheel 87 (Fig. 19) and provide a spring-actuated arm 88 pivotally mounted and carrying a pawl 89 adapted to rotate said ratchet wheel and the corresponding roller, 77, when said arm 88 moves down; also a non-return pawl 90. Arm 88 is actuated by a slide 91, provided with a pin 91' arranged to be engaged, when said slide is in its lowermost position, by a cam 92 carried by the snapper-arm 60; said cam raising said slide when the snapper-arm 60 is depressed by the depression of the alining key 16. When so raised the slide is held by a holding-pawl 93, adapted to enter a notch in said slide. In Fig. 19 the slide is shown in full lines in its elevated position, and in dotted lines in its lowermost position. When the lower-most or right-hand adding wheel 1, or its corresponding zero key 68, is operated, and the hammer 51 thereof retracted, as previously described, a pin 94 (Fig. 19) carried by that hammer only, engages a trip-pawl 95 as such hammer is depressed by engagement of its tooth 64 with the tooth 65 of the snapper 60, said pawl yielding and permitting the pin 94 to pass beneath it; but on the ensuing upward movement of said pin 94, the pawl is lifted, raising with it the holding-pawl 93, and so releasing the slide 91, which is then moved down by the spring of arm 88, the feeding-pawl 89 engaging the ratchet wheel 87 and feeding the rollers 77 and 78 forward one space. The ratchet clutch 82 (Fig. 17) permits the rollers to be fed forward step-by-step in this manner, without disengaging pinion 80 from sector 83 (by which the paper is fed forward from the item-printing point to the total-printing point when the total is to be printed). In Fig. 19, that hammer 51 which actuates the trip-pawl 95 as described, is shown in full lines in its normal position, and is shown in dotted lines retracted so as to be operated by the snapper to print the last figure in the number and to trip the feeding mechanism.

It will be observed that in operating the adding mechanism for a number, the operation of the first adding wheel 1 (customarily the wheel corresponding to the first numeral of the number) will cause the slide 91 and pawl 89 to be raised by the cam 92 (since the first depression of the alining key 16 will cause the depression of the snapper 60 and consequent operation of cam 92); said slide being then held in such raised position by pawl 93; and that said pawl 93 will not be tripped until the last or right-hand wheel 1 (or its corresponding zero key 68) has been operated. Therefore the paper is fed forward one space only for each complete number added.

Any suitable mechanism may be employed for feeding the ink-ribbons 48 and 76. In Figs. 23 and 24 we have indicated one simple mechanism for the purpose, the spools 96 of said ribbons being mounted on shafts 97 and 98, on each of which are two opposed bevel gears 99 and 100, splined to said shafts, and arranged to mesh, one or the other of each pair, with a bevel gear 101 carried by the shaft of feed roller 78. To reverse the direction of feed of the ribbons we have indicated pivoted yokes 102 one for each gear 99 and 100, each pair of such yokes connected by a link 103, and one yoke of each pair mounted on a rock-shaft 104, provided with a handle 105 by which said rock-shaft may be operated to shift one gear or the other of each of said pairs into engagement with the gear of the feed roller 78.

Instead of employing concentric shafts 38 and 72 for transmitting motion from the several adding elements to the item-printing wheels and total-printing wheels, we may employ gears and counter-shafts. In Figs. 15 and 16 we have indicated such an arrangement of gears and countershafts in the mechanism for driving the item-printing wheels. According to the construction there shown, each gear wheel 37 is drivingly connected to a corresponding gear wheel 106; each such gear 106 having a corresponding pinion 107 mounted on a counter-shaft 108, and provided, at its other end, with a like pinion 109 intermeshing with a gear 110 corresponding to such gear 106 and in driving connection with the corresponding printing wheel 39. Such mechanisms as these are sometimes called "cross-over mechanisms," and we do not limit ourselves to the use of any particular mechanism of the sort, but may use anything suitable.

We customarily provide the hubs of the transmission gears 7 (Figs. 2, 3, 6 and 9,) with retarding springs 111 which retard slightly, by friction, the motion of the said gears 7.

What we claim is:—

1. A calculating machine of the character described, comprising in combination a plurality of operating members capable of continuous rotation in either direction at will, total-indicating means, gear connecting the total-indicating means with said members, and transfer mechanism for carrying from one of said members to the next, operative for either direction of motion of said operating members, said transfer mechanism comprising a toothed member rotatable in either direction and arranged to engage intermittently a corresponding member to be driven thereby.

2. A calculating machine of the character described, comprising in combination a plurality of operating members capable of continuous motion in either direction at will, and each provided with a plurality of teeth and corresponding finger holds, and transfer mechanism for carrying from one such member to the other comprising gear wheels adapted to mesh with the teeth of said operating members and means for interlocking one said gear wheel momentarily with the other at the conclusion of the movement of one of them through a predetermined number of spaces.

3. A calculating machine of the character described, comprising in combination a plurality of operating members capable of continuous motion in either direction at will, and each provided with a plurality of teeth and corresponding finger holds, and transfer mechanism for carrying from one such member to the other comprising gear wheels adapted to mesh with the teeth of said operating members, means for interlocking one said gear wheel with the other at the conclusion of the movement of one of them through a predetermined number of spaces, and means for disengaging said gear wheels at the conclusion of the movement of such second wheel through one space.

4. A calculating machine of the character described, comprising in combination a plurality of operating members provided each with a plurality of teeth, and transfer mechanism for carrying from one said member to the other, comprising two gear wheels adapted to mesh respectively with the teeth of said members, and means for interlocking said gears with each other at the conclusion of the movement of one of said gears through a predetermined number of spaces.

5. A calculating machine of the character described, comprising in combination a plurality of operating members provided each with a plurality of teeth, and transfer mechanism for carrying from one said member to the other, comprising two gear wheels, adapted to mesh respectively with the teeth of said members, and means rotating with one of said gear wheels adapted to interlock the other said gear wheel momentarily during its revolution.

6. A calculating machine of the character described, comprising in combination a plurality of operating members provided each with a plurality of teeth, and transfer mechanism for carrying from one said member to the other, comprising two gear wheels, adapted to mesh respectively with the teeth of said members, and means rotating with one of said gear wheels adapted to be moved, once in each of its rotations, into engagement with the other said gear wheel, and arranged to be so moved by its corresponding operating member.

7. A calculating machine of the character described, comprising in combination a plurality of operating members provided each with a plurality of teeth, two gears arranged to rotate about the same axis and in mesh with the teeth of said operating members respectively, and a sliding member, carried by one said gears, and provided with means for engaging the other gear at will, and arranged to be moved into engagement with such other gear by engagement with a tooth of the corresponding operating member.

8. A calculating machine of the character described, comprising in combination a plurality of operating members provided each with a plurality of teeth, two gears arranged to rotate about the same axis and to mesh with the teeth of said operating members respectively, and a sliding member, carried by one of said gears, provided with means for engaging the other gear at will and provided with a spring tending to press it out of such engagement, said sliding member arranged to be pressed into engagement, once in each revolution, by a tooth of the corresponding operating member.

9. A calculating machine of the character described, comprising in combination a plurality of operating members provided each with a plurality of teeth, and transfer means for driving one of said members from the other, comprising two gears arranged to mesh with the driving and driven members respectively, the driven gear provided also with a series of recesses out of meshing position with respect to the corresponding operating member, the driving gear provided with a sliding member provided with means for engaging such recesses and with a spring normally preventing such engagement, said sliding member arranged to be engaged, once in each revolution, by the corresponding operating member and to be forced thereby into engagement with one of said recesses of said driven gear.

10. A calculating machine of the character described, comprising in combination a plurality of toothed operating members, two gears arranged to mesh each with one of said members, one of said gears provided with a series of notches, and a sliding member on the other gear arranged to be pressed by its corresponding operating member, into engagement with one of said notches, once in each revolution, and provided with a spring normally holding it out of such engagement.

11. A calculating machine of the character described, comprising in combination a plurality of toothed operating members, and two gears arranged to mesh each with one of said members and provided with means for interlocking said gears when one of said operating members has moved through a predetermined number of spaces and provided also with total-indicating means.

12. A calculating machine of the character described, comprising in combination a plurality of toothed operating members, adapted to operate in each of two opposite directions, and gears arranged to mesh each with one of said members, means for interlocking said gears when one of them has moved through a predetermined number of spaces, and overtravel-preventing means for preventing overtravel of said gears.

13. A calculating machine of the character described, comprising in combination a plurality of toothed operating members, two gears arranged to mesh each with one of said members, means for interlocking said gears when one of them has moved through a predetermined number of spaces, and alining means comprising means for forcing said gears into alinement.

14. A calculating machine of the character described, comprising in combination a plurality of toothed operating members, two gears arranged each to mesh with one of said members, means for interlocking said gears when one of them has moved through a predetermined number of spaces, total-indicating means operated in connection with said gears, and alining means comprising means for forcing said total-indicating means into alinement.

15. A calculating machine of the character described, comprising in combination a plurality of operating members capable of rotation, transfer mechanism for carrying from one member to another member, a total-indicating mechanism, interconnecting gear for the several mechanisms, a yielding bar arranged to form a stop for the operation of the several operating members and inclined blades under the control of the yielding bar for positively forcing the members into alinement.

16. A calculating machine of the character described, comprising in combination a plurality of adding elements, including the transfer mechanism for carrying from one element to another, each such element including an operating member and indicating means, and alining means arranged to be operated simultaneously with said operating members, said alining means comprising devices under the control of the finger of the operator in operating the operating member for forcing said indicating means into alinement.

17. A calculating machine of the character described, comprising in combination a plurality of adding elements including transfer mechanism for carrying from one element to another, each such element including indicating means and an operating member arranged to be operated by hand and having a plurality of finger holds, and alining means comprising an operating member arranged to be engaged and operated by a finger of the operator during the operation of one of the operating members and also comprising a device for engaging and forcing said indicating means into alinement.

18. A calculating machine of the character described, comprising in combination a plurality of adding elements including toothed operating members and transfer mechanism including gears adapted to mesh with the teeth of said operating members, and alining means comprising means for forcing said gears into alinement at the conclusion of the operation of one of said operating members.

19. A calculating machine of the character described, comprising in combination a plurality of toothed operating members, transfer mechanism comprising gears adapted to mesh with the teeth of said members, means for engaging said gears intermittently, and alining means for said gears.

20. A calculating machine of the character described, comprising in combination a plurality of toothed operating members, transfer mechanism comprising gears adapted to mesh with the teeth of said members, means for interlocking said gears intermittently, and alining means for said gears including an operating member arranged to be operated when one of said first-mentioned operating members is operating.

21. A calculating machine of the character described, comprising in combination a plurality of toothed hand-operated operating members arranged side by side and transfer mechanism for carrying from one to the other, two total-indicating means, and alining means comprising an operating member arranged in proximity to said first named operating members and to be operated simultaneously therewith, said alining means comprising means for forcing the total-indicating means into alinement.

22. A calculating machine of the character described, comprising in combination toothed operating members arranged side by side, transfer mechanism for carrying from one to another of said members, including gears adapted to mesh with the teeth of said operating members and having cam surfaces and alining means comprising a key arranged to be operated at the conclusion of the operation of one of said members, and means operated by said key arranged to engage said cam surface and aline said gears when said key is operated.

23. A calculating machine of the character described, comprising in combination a plurality of toothed operating members, two gears adapted to mesh each with the teeth of one of said members, connecting means carried by one said gear and arranged to engage the other said gear at intervals, an alining key, alining cams arranged to be operated thereby and to engage and aline said gears, catches normally connecting said key and alining cams, and means operated by said connecting means arranged to trip the catch of the corresponding alining cam and release the same into engagement with the corresponding gear, when said connecting means operates.

24. A calculating machine of the character described, comprising in combination a plurality of toothed operating members, two gears adapted to mesh each with the teeth of one of said members, an alining key opposite said operating members, alining cams beneath said key and arranged to be moved thereby into engagement with said gears and engage the same, and means for transmitting motion from one such gear to the other.

25. A calculating machine of the character described, comprising in combination a plurality of toothed operating members, two gears adapted to mesh each with the teeth of one of said members, an alining key opposite said operating members, alining cams arranged to be moved by said key into engagement with said gears and to aline the same, tripping catches operated by said key arranged to withdraw said cams, means for transmitting motion from one gear to the other, and means for tripping said catches to prevent overtravel.

26. A calculating machine of the character described, comprising in combination a plurality of toothed operating members, two gears adapted to mesh each with the teeth of one of said members, said gears having teeth with wedge side-faces, means for engaging one said gear with the other periodically, cams arranged to engage said teeth to wedge the teeth of the two gears into alinement, and means operated at the conclusion of the operating of one said operating member, for so operating said cams.

27. A calculating machine of the character described, comprising in combination a plurality of toothed operating members, two gears adapted to mesh each with the teeth of one of said members, said gears provided with inclined wedge-faces, cams arranged to engage such wedge-faces to wedge the teeth of the two gears into alinement, a key arranged across the faces of said operating members and arranged to be actuated when one of said members is actuated, and to actuate said cams, and means for engaging one gear with the other periodically.

28. A calculating machine of the character described, comprising in combination a plurality of toothed operating members, two gears adapted to mesh each with the teeth of one of said members, said gears provided with inclined wedge-faces, cams arranged to engage such wedge-faces to wedge the teeth of the two gears into alinement, a key arranged across the faces of said operating members and arranged to be actuated when one of said members is actuated, and to actuate said cams, tripping catches for connecting said key and cams to withdraw the latter, means for engaging one gear with the other periodically, and means for tripping the corresponding catch when such engagement occurs, said catches spring-actuated to reëngage their cams when said key is operated.

29. A calculating machine of the character described, comprising in combination a series of operating members capable of continuous motion, each provided with a plurality of finger-holds, means for carrying from one to another of said members comprising a series of transfer mechanisms, and resetting means comprising means for arresting each of said transfer mechanisms upon its return to zero position.

30. A calculating machine of the character described, comprising in combination a series of operating members capable of continuous motion each provided with a plurality of finger-holds, means for carrying from one to another of said members comprising a series of transfer mechanisms, and resetting means comprising means for arresting each of said transfer mechanisms upon its return to zero position and means for disengaging said arresting means from said transfer mechanisms.

31. A calculating machine of the character described, comprising in combination a plurality of operating members provided each with a plurality of teeth, carrying means for transfer from one such operating member to another comprising gear wheels corresponding to and adapted to mesh with the teeth of said operating members, respectively, each such gear wheel provided with indicating means, means for connecting the gear wheel of one such operating member with the corresponding gear wheel of the operating member next beyond at the conclusion of movement of such first gear wheel through a predetermined number of spaces, and resetting means comprising means for arresting each such gear wheel upon its return to zero position.

32. A calculating machine of the character described, comprising in combination a plurality of operating members provided with teeth, carrying means for carrying from one such operating member to another comprising gear wheels corresponding to and adapted to mesh with the teeth of said operating members, respectively, each such gear wheel provided with indicating means, means for connecting the gear wheel of one such operating member with the corresponding gear wheel of the operating member next beyond at the conclusion of movement of such first gear wheel through a predetermined number of spaces, and resetting means comprising arresting devices for the several indicating devices, adapted to be moved into engagement therewith and when in such engagement to arrest each upon its return to zero position.

33. A calculating machine of the character described, comprising in combination a plurality of operating members provided with teeth, carrying means for carrying from one such operating member to another comprising gear wheels corresponding to and adapted to mesh with the teeth of said operating members, respectively, each such gear wheel provided with indicating means, means for connecting the gear wheel of one such operating member with the corresponding gear wheel of the operating member next beyond at the conclusion of movement of such first gear wheel through a predetermined number of spaces, and resetting means comprising arresting devices for the several indicating devices, adapted to be moved into engagement therewith and when in such engagement to arrest each upon its return to zero position, and means for moving said arresting means into and out of such engagement.

34. In a calculating machine of the character described the combination with adding means comprising a plurality of operating members, indicating means therefor, carrying means and resetting means comprising a shaft, arresting means for said indicating means on said shaft, means for operating said shaft to engage said arresting means with their corresponding indicating means, a detent for said shaft for holding said arresting means in such engaging position, and means for tripping said detent.

35. In a calculating machine of the character described the combination with adding means comprising a plurality of operating members, indicating carrying means, resetting means for said indicating means comprising arresting means for the several indicating means, means for moving said arresting means into engagement with their respective indicating means, detent means for holding them in such engagement, and a key for tripping said detent.

36. A calculating machine of the character described, comprising in combination a plurality of operating members capable of continuous motion, carrying mechanism for carrying from one said member to another and listing means comprising rotary number wheels, one for each such operating member, arranged to be rotated by the operation thereof, and means for printing from said number wheels.

37. A calculating machine of the character described, comprising in combination a plurality of operating members capable of continuous motion, carrying mechanism for carrying from one said member to another, and listing means comprising rotary number wheels, one for each such operating member, arranged to be rotated by the operation thereof, means for printing from said number wheels, and means arranged to be operated concurrently with one of said operating members for returning said wheels to normal.

38. A calculating machine of the character described, comprising in combination a plurality of operating members capable of continuous motion, carrying mechanism, for carrying from one said member to another, listing means comprising rotary number wheels, one for each such operating member, arranged to be rotated by the operation thereof, means for printing from said number wheels, and an alining key and alining means operated thereby, said key arranged to effect return of said wheels to normal.

39. A calculating machine of the character described, comprising in combination a plurality of operating members provided with gear teeth and finger holds, carrying mechanism driven by said gear teeth, listing means comprising rotary number wheels, one for each such operating member, arranged to be rotated by the operation thereof, means for printing from said number wheels, and means arranged to be actuated by the operator's finger when actuating one of said operating members, for returning said wheels to normal.

40. A calculating machine of the character described, comprising in combination a plurality of operating members provided with gear teeth, carrying mechanism driven by said gear teeth, listing means comprising rotary number wheels, one for each such operating member, and gears corresponding to and in driving connection with said number wheels respectively and adapted to be driven by the teeth of the corresponding operating members, and means for printing from said number wheels.

41. A calculating machine of the character described, comprising in combination a plurality of operating members provided with gear teeth, carrying mechanism, driven by said gear teeth, listing means comprising rotary number wheels, one for each such operating member, and gears corresponding to and in driving connection with said number wheels respectively and adapted to be driven by the teeth of the corresponding operating members, means for printing from said number wheels, and means for returning said wheels to normal.

42. A calculating machine of the character described, comprising in combination a plurality of operating members provided with gear teeth, carrying mechanism driven by said gear teeth, listing means comprising rotary number wheels, one for each such operating member, gears corresponding to and in driving connection with said number wheels respectively and adapted to be driven by the teeth of the corresponding operating members, means for printing from said number wheels, springs tending to return said number wheels to normal, and means for disengaging said gears from said operating members to permit such return.

43. A calculating machine of the character described, comprising in combination a plurality of operating members provided with gear teeth, carrying mechanism driven by said gear teeth, listing means comprising rotary number wheels, one for each such operating member, concentric shafts for said wheels, gears on said shafts adapted to be driven by the teeth of the corresponding operating members, a rocking carrier for said shafts, springs tending to return said number wheels to normal, and means for moving said carrier to disengage said gears from said operating members to permit such return.

44. A calculating machine of the character described, comprising in combination a plurality of operating members capable of continuous motion, carrying mechanism for carrying from one said member to another, listing means comprising a separate recording member for each such operating member and means for operating the same, and a zero key for each such operating member, arranged to actuate said listing means to register zero when the corresponding operating member is to be passed over.

45. A calculating machine of the character described, comprising in combination a plurality of continuously movable operating members, carrying mechanism for carrying from one said member to another, and listing means comprising a separate recording member for each such operating member and means for operating the same, hammers corresponding to the several recording members, means operated concurrently with the operation of each such recording member for moving said hammer into position for engagement by a snapper, and a snapper and means for operating the same.

46. A calculating machine of the character described, comprising in combination a plurality of operating members capable of continuous motion, indicating means therefor, carrying mechanism for carrying from one said member to another means, said indicating means comprising a separate recording member for each operating member, operated concurrently therewith, and a zero key for each such operating member, arranged to cause the corresponding recording member to record zero when such key is operated.

47. A calculating machine of the character described, comprising in combination a plurality of operating members capable of continuous motion, indicating means therefor, carrying mechanism for carrying from one said member to another, said indicating means comprising a separate recording member for each operating member, operated concurrently therewith, hammers corresponding to the several recording members, means operated concurrently with the operation of such recording member for moving the corresponding hammer into position for engagement by a snapper, and a snapper and means for operating the same.

48. A calculating machine of the character described, comprising in combination a plurality of operating members capable of continuous motion, indicating means therefor, carrying mechanism, said indicating means comprising a separate recording member for each operating member, operated concurrently therewith, hammers corresponding to the several recording members, means operated concurrently with the operation of such recording member for moving the corresponding hammer into position for engagement by a snapper, a snapper, and a key arranged to be operated concurrently with the operation of said operating members and to operate said snapper.

49. A calculating machine of the character described, comprising in combination a plurality of operating members capable of continuous motion, carrying mechanism for carrying from one said member to another, and total-recording means comprising rotary number wheels, one for each such operating member, means for rotating said wheels when said operating members are operated, and means for printing from said number wheels.

50. A calculating machine of the character described, comprising in combination, a plurality of operating members capable of continuous motion, carrying mechanism for carrying from one said member to another, and total-recording means comprising rotary number wheels, one for each such operating member, means driven by said carrying mechanism for rotating said wheels, and means for printing from said number wheels.

51. A calculating machine of the character described, comprising in combination a plurality of operating members capable of continuous motion, carrying mechanism for carrying from one said member to another, total-recording means comprising rotary number wheels, one for each such operating member, means for rotating said wheels when said operating members are operated, and an alining key and alining means operated thereby arranged to correct alinement of said wheels.

52. A calculating machine of the character described, comprising in combination a plurality of operating members, capable of continuous motion, carrying mechanism comprising gear wheels, and total-recording means comprising rotary number wheels and means driven by said gear wheels for rotating said number wheels, and means for printing from said number wheels.

53. A calculating machine of the character described, comprising in combination a plurality of operating members capable of continuous motion, carrying mechanism comprising gear wheels, and total-recording means comprising rotary number wheels, concentric shafts upon which said number wheels are mounted, pinions on said shafts in mesh with the gears of said carrying mechanism, and means for printing from said number wheels.

54. A calculating machine of the character described, comprising in combination a plurality of operating members, carrying mechanism, listing mechanism for carrying from one said member to another, total-recording means, and feed mechanism for feeding a record from said listing mechanism to said total-recording means.

55. A calculating machine of the character described, comprising in combination a plurality of operating members, carrying mechanism for carrying from one said member to another, listing means comprising a plurality of printing wheels and means for rotating same when said operating members are operated, total-recording means comprising a plurality of printing wheels and means for rotating same when said operating members are operated, and feed mechanism for feeding a record from said listing mechanism to said total-recording means.

In testimony whereof we affix our signatures, in the presence of two witnesses.

JOSEPH FORSHEIM.
JOSEPH KONIGSBERG.

Witnesses:
H. M. MARBLE,
MAY I. TRIMBLE.

Copies of this patent may be obtained for five cents each, by addressing the "Commissioner of Patents, Washington, D. C."